T. MAYR.
COMBINED SNAP AND SLIDE FASTENER.
APPLICATION FILED APR. 8, 1921.
1,403,802.   Patented Jan. 17, 1922.
Fig. 1
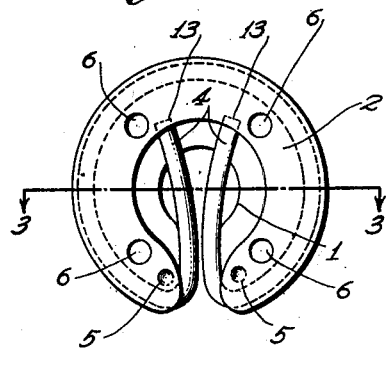
Fig. 2
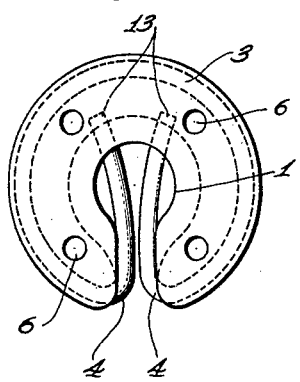
Fig. 3
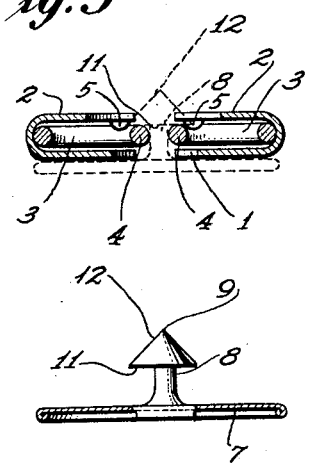
Fig. 4
Fig. 5
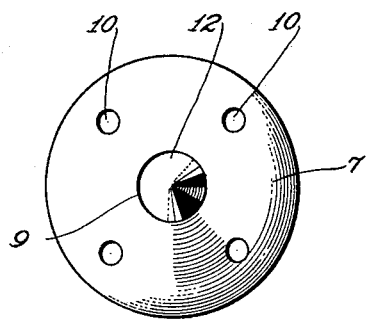
INVENTOR
Tony Mayr
BY Jas. H. Griffin
ATTORNEY

UNITED STATES PATENT OFFICE.

TONY MAYR, OF NEW YORK, N. Y.

COMBINED SNAP AND SLIDE FASTENER.

1,403,802.

Specification of Letters Patent.   Patented Jan. 17, 1922.

Application filed April 8, 1921. Serial No. 459,702.

*To all whom it may concern:*

Be it known that I, TONY MAYR, a citizen of Austria, (but having taken out his first papers, with the intention of becoming a citizen of the United States,) residing at New York city, borough of Manhattan, in the county and State of New York, have invented a certain new and useful Combined Snap and Slide Fastener, of which the following is a specification.

This invention is a combined snap and slide fastener particularly adapted for use on female articles of apparel, although adapted for broad and general application.

The object of the invention is to provide a snap fastener embodying male and female members which may be brought into cooperative relation by bringing said members into alinement and snapping them into cooperative relation, but which cannot be drawn apart by reversing these operations.

Speaking generally, the invention embodies a female member provided with a radially extending slot and within which member a resilient wire is bent or curved in such manner as to provide gripping jaws extending in a generally longitudinal direction across the slot. The male member is made in the form of a stud provided with an attaching plate having a central shank which terminates in a head. The base of the head is made flat, while the top of the head is tapered to substantially a point. This construction permits the male member to be brought into alinement with the female member, whereupon the members may be pressed together.

During this operation, the tapered portion of the head serves to force the gripping jaws of the resilient wire of the female member apart, until the head is passed these jaws whereupon they spring together beneath the head. Since the bottom of the head is flat, the members cannot be pulled apart by tension exerted in a direction perpendicularly to the faces of the male and female members, and in order to disengage the members, one must be held in fixed position and while the other is shifted laterally, so as to cause the shank of the male member to radially traverse the slot of the female member and in this manner disengage the head of the male member from the female member.

Fasteners of the general character under consideration have heretofore been suggested, but in all of these prior fasteners, so far as I am aware, the male member is required to be moved radially of the slot of the female member in order to bring said members into interlocked relation, and in separating said members, this operation is reversed. No fastener, so far as I am aware, is so constructed as to permit the two members to be sprung together after the manner of the conventional snap fastener.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 is a face view of the back of the female member.

Figure 2 is a front view of the female member.

Figure 3 is a section on the line 3—3 of Figure 1.

Figure 4 is a central section of the male member; and,

Figure 5 is a plan view of the male member.

The female member is preferably made of sheet metal, is of circular form and is provided with a radially extending slot 1 preferably enlarged at its inner end and extending to the outer periphery of the female member. The sheet metal blank from which the female member is formed is flanged inwardly from its outer periphery as at 2 to provide a peripheral channel or housing in which a spring clip 3 is positioned. The spring clip forms throughout substantially the entire periphery of the channel to the shape of such channel, and is provided at its ends with inturned arms 4, which extend in a substantially longitudinal direction relative to the slot 1 and in positions to overlie or bridge such slot. The clip 3 is preferably made of spring wire, so that the arms 4 are resilient and are normally maintained, through the resiliency of the wire in contact with one another or very nearly so. In order to preclude the spring clip from rotary movement relative to the body portion of the female member, the flange 2 may be indented as at 5 to lock the clip against such rotation without interfering with the resilient properties of such clip. The female member is preferably provided with perforations 6, through which a thread may be passed for the purpose of securing the female member to a garment.

The male member is made in the form of a stud embodying an attaching plate 7 provided with a central shank 8 and a head 9. The parts of the stud may be made integral and may be formed separate or united in any suitable manner. In any event, the base 7 is preferably provided with a plurality of perforations 10, through which a thread may be passed to secure the stud to such part of the garment as it is desired to secure to that portion of the garment on which the female member is mounted.

An important feature of the present invention results in the formation of the head 9 of the stud and from the drawings, it will appear that the base or under side 11 of the head 9 is made flat, while the top of the head 12 is tapered or conical. By so forming the head an important advantage results which is not obtainable in a head provided with a flat top as is commonly the case in fasteners of the character under consideration. By forming the surface 12 on a sharp taper, it will be apparent that if the male and female members are brought into juxtaposition with the head 9 of the stud in alinement with the enlarged central portion of the head 1, pressure may be applied to said members to force them into interlocked relation. In other words, the tapered surface 12 may be forced between the arms 4 in such manner as to cause them to spring apart, while the head 9 is passing between the arms. After the head 9 is passed between the arms, said arms will again spring together, beneath the head 9 and as the surface 11 is flat, the stud cannot be pulled away from the female member, but will be locked thereto by the spring clip. In order to remove the stud from the spring clip, it will be necessary to shift the stud in a lateral direction with respect to the female member, so as to cause the shank 8 to travel longitudinally of the slot 1 until it is disengaged from the spring arms 4.

It will be apparent from the foregoing description that the fastener of this invention is a marked improvement over that type of fastener, the members of which are brought into interlocking relation by a lateral movement between the parts and are disengaged from one another by reversal of such movement. In such devices, considerable time and patience is required to properly locate the shank of the stud in the mouth of the slot of the female member, whereas with the present invention, the parts are simply snapped together in the manner common to the conventional snap fastener.

In practice, the spring arms 4 are preferably of such length that their ends 13 will lie beneath the flange 2, so that when the stud is forced into position, these arms will not be flexed or bent in any other direction than away from one another. This insures proper cooperation between the parts at all times and precludes such bending of the clip as would render it inoperative.

From what has been stated, it will appear that the fastener of the present invention may be accurately termed a combined snap and slide fastener, since the male and female members are snapped together and are slid apart.

Having thus fully described the invention, what I claim as new and desire to secure by Letters Patent is:

1. A combined snap and slide fastener embodying a female member provided with a radially extending slot, a spring clip associated with the female member and including resilient clamping means extending across the slot, in combination with a male member provided with a shank and a head having a substantially flat back and a tapered top, whereby the tapered top of the head may be sprung into engagement with the resilient clamping means of the female member and can only be removed from said female member by sliding the shank of the male member through the slot of the female member.

2. A combined snap and slide fastener embodying a female member provided with a substantially radial slot, a spring clip associated with the female member and having resilient arms extending longitudinally of said slot, in combination with a stud embodying a shank, and a head on said shank, said head having a substantially flat base and a substantially conical top, which permits the forcing of the head through the slot to a point beyond the resilient arms, in which position the flat bottom of the head precludes retrograde movement thereof, whereby the stud can only be removed by passing the shank longitudinally of the slot and out of engagement with the resilient arms.

In testimony whereof, I have signed the foregoing specification.

TONY MAYR.